(12) United States Patent
Glennerster

(10) Patent No.: US 10,816,151 B2
(45) Date of Patent: Oct. 27, 2020

(54) LIGHTING SYSTEM

(71) Applicant: Smart Garden Products Ltd., Oxfordshire (GB)

(72) Inventor: Stuart Glennerster, Buckinghamshire (GB)

(73) Assignee: Smart Garden Products Ltd., Abingdon, Oxfordshire (GB)

( * ) Notice: Subject to any disclaimer, the term of this patent is extended or adjusted under 35 U.S.C. 154(b) by 516 days.

(21) Appl. No.: 15/789,672

(22) Filed: Oct. 20, 2017

(65) Prior Publication Data

US 2019/0041016 A1   Feb. 7, 2019

(51) Int. Cl.
*F21S 9/03*       (2006.01)
*F21V 23/00*      (2015.01)
(Continued)

(52) U.S. Cl.
CPC .......... *F21S 9/032* (2013.01); *F21S 4/26* (2016.01); *F21V 23/001* (2013.01); *F21V 23/003* (2013.01); *F21V 31/00* (2013.01); *H02J 7/35* (2013.01); *H05B 45/10* (2020.01); *H05B 47/11* (2020.01); *H05B 47/16* (2020.01); *F21W 2131/10* (2013.01); *Y02B 20/40* (2013.01)

(58) Field of Classification Search
CPC .......... F21S 4/26; F21S 9/032; F21V 23/001; F21V 23/003; F21V 23/02; F21V 31/00; H02J 7/35; H05B 45/10; H05B 47/11; H05B 47/16; F21W 2131/10; Y02B 20/40; Y02B 20/46
USPC ...................... 307/48; 315/51, 294
See application file for complete search history.

(56) References Cited

U.S. PATENT DOCUMENTS 6,290,367 B1   9/2001   Greenhoe et al. ............ 362/183
2003/0230334 A1   12/2003   Chang et al. ................ 136/244
(Continued)

FOREIGN PATENT DOCUMENTS

AU   2011100262   2/2011   ............... F21S 4/00
CN   101526190 A   3/2009   ............... F21S 9/03
(Continued)

OTHER PUBLICATIONS

Search Report of Counterpart EPO application 18187000.7.
Search Report of Counterpart UK application GB 1712537.8.

*Primary Examiner* — Rexford N Barnie
*Assistant Examiner* — Toan T Vu
(74) *Attorney, Agent, or Firm* — MacCord Mason PLLC

(57) ABSTRACT

There is provided a lighting system, comprising a control unit (10), a solar panel (20) for plugging into the control unit, and at least one light (32) connected to the control unit. The control unit comprises a control circuit (12), a battery bay for receiving at least one battery (16) that supplies battery power to the control circuit, and a socket (14) for receiving a plug (24) of the solar panel for supplying solar power to the control circuit. The control circuit (12) detects whether the solar panel is plugged into the control unit, and in response switches from a battery power mode in which the control circuit powers the at least one light from the battery power, to a solar power mode in which the control circuit powers the at least one light from the solar power, wherein the solar power mode is an energy saving mode which uses less energy in comparison to the battery power mode.

15 Claims, 3 Drawing Sheets

(51) Int. Cl.
*F21V 31/00* (2006.01)
*H02J 7/35* (2006.01)
*H05B 37/02* (2006.01)
*F21S 4/26* (2016.01)
*H05B 45/10* (2020.01)
*H05B 47/11* (2020.01)
*H05B 47/16* (2020.01)
*F21W 131/10* (2006.01)

(56) References Cited

U.S. PATENT DOCUMENTS

| | | | |
|---|---|---|---|
| 2007/0297167 A1* | 12/2007 | Greenhoe | F21L 4/08 |
| | | | 362/183 |
| 2011/0089839 A1 | 4/2011 | Chen | 315/149 |
| 2011/0285315 A1* | 11/2011 | Matthews | H05B 45/10 |
| | | | 315/294 |
| 2014/0354150 A1* | 12/2014 | Joseph | H05B 45/20 |
| | | | 315/51 |

FOREIGN PATENT DOCUMENTS

| | | | |
|---|---|---|---|
| CN | 102303666 A | 1/2012 | B62J 6/00 |
| CN | 102588864 A | 7/2012 | F21S 9/03 |
| CN | 105387418 A | 3/2016 | F21S 9/03 |
| EP | 2437374 | 4/2012 | H02J 9/02 |
| EP | 2945468 | 11/2015 | H02B 37/00 |

\* cited by examiner

LIGHTING SYSTEM

This application claims the benefit of Great Britain Application GB1712537.8 filed Aug. 4, 2017.

DESCRIPTION

The present invention relates to a lighting system, which uses battery power and solar power to power at least one light.

BACKGROUND OF THE INVENTION

Solar power is sometimes used to power outdoor lights, for example ornamental lamps and LED rope lights where solar power stored during daytime is used to power the lights during night time. The problem with solar powered lights has always been their performance in winter. In winter, the average amount and strength of sunlight is approximately one tenth of that in summer, and so only one tenth of the lighting performance is obtained, often equating to minutes of lighting rather than hours.

It is known to add a back-up battery to solar powered lights, to help take over from the stored solar power once it has been depleted. However, this requires the back-up battery to be changed once it becomes depleted, and customers seeking a solar-powered light often do so with the aim of avoiding having to change batteries. Complex power-sharing schemes between batteries and solar panels are not always properly understood by customers and can lead to confusion.

It is also known to provide outdoor lights which only use battery power, rather than solar power. These typically output higher light levels than solar powered lights due to the extra power that is available, however have the drawback of requiring regular battery replacement. Due to requirement for regular battery replacement, these types of lights are typically run over short periods such as the Christmas season and then put away.

It is therefore an object of the invention to improve upon known lighting systems.

SUMMARY OF THE INVENTION

According to a first aspect of the invention, there is provided a lighting system, comprising a control unit, a solar panel for plugging into the control unit, and at least one light connected to the control unit. The control unit comprises a control circuit, a battery bay for receiving at least one battery that supplies battery power to the control circuit, and a socket for receiving a plug of the solar panel for supplying solar power to the control circuit. The control circuit detects whether the solar panel is plugged into the control unit, and in response switches from a battery power mode in which the control circuit powers the at least one light from the battery power, to a solar power mode in which the control circuit powers the at least one light from the solar power, wherein the solar power mode is an energy saving mode which uses less energy in comparison to the battery power mode.

Therefore, there is provided a lighting system which is able to automatically detect when a solar panel is plugged into it, and in response to that detection enter an energy saving mode intended to maximise the use of the solar energy. Accordingly, customers desiring a battery powered light can still retain the higher-powered lighting that battery power allows, with the option to plug in the solar panel whenever the customer wishes to save on batteries. The lighting system is therefore primarily a battery powered lighting system, with the option to upgrade the light by plugging in the solar panel so that the light can be run from solar during the summer.

The control unit automatically switches to the energy saving mode when the solar panel is plugged in, for example by reducing the time and/or intensity that the lights are lit for, making the lighting system easy and convenient to use, and simple for customers to understand.

The solar panel may comprise a rechargeable battery so the solar panel can supply solar power to the control unit at night time, or a rechargeable battery (solar power storage battery) may be provided in the control unit so that solar power received from the solar panel can be stored during daytime and drawn from the solar power storage battery by the control circuit during night time. Preferably, the control unit comprises a light sensor, and the control circuit powers the at least one light for a predetermined time at a predetermined intensity after the light sensor indicates that night time has begun. Alternatively, the control circuit may comprise a timer to control the time of day at which the control circuit turns on the at least one light, at the predetermined intensity for the predetermined time. The predetermined time and the predetermined intensity may be set differently for the solar power mode compared to the battery power mode, so that the solar power mode saves energy compared to the battery power mode.

The control circuit may detect whether the solar panel is plugged into the control unit by sensing a voltage or current received from the solar panel. When a voltage or current corresponding to a solar panel is received at the socket of the control unit, the control circuit determines that the solar panel is connected, and automatically switches into the solar power (energy saving) mode. In an embodiment where the solar panel does not include any rechargeable battery, the control circuit may be configured to perform detection only when the light sensor of the control unit indicates that it is daytime. Then, once night falls and the solar panel stops producing electricity, the control circuit will not erroneously switch, to battery power mode.

Alternatively, the plug of the solar panel may comprise contacts which complete a circuit of the control circuit when the plug of the solar panel is plugged into the socket, indicating to the control circuit that the solar panel has been plugged in. Other methods of automatically detecting whether the solar panel has been plugged in will also be apparent to those skilled in the art, for example the plug and socket could comprise communication contacts that allow the solar panel to convey status information to the control circuit.

The lighting system may further comprise a power adaptor having a plug for supplying mains power to the socket of the control unit. Then, the same socket as for plugging in the solar panel can alternatively be used for plugging in the power adaptor. This allows mains power to be used if the control unit is situated at a location where mains power is readily available. The control circuit may detect whether the power adaptor is plugged into the control unit, in a similar manner in which it detects whether the solar panel has been plugged in, and in response switch to a mains power mode in which the control circuit powers the at least one light from the mains power. Preferably, the mains power mode uses more energy in comparison to the solar power mode, and may use more energy than the battery power mode by driving the light(s) at higher intensity (brightness) and/or for a greater length of time overnight compared to the battery power mode.

Various types of lights may be driven by the control unit, for example the at least one light may comprise a lamp mounted in a garden ornament or on a pedestal. The lamp may be housed in a light housing, with the control unit mounted on or adjacent the light housing. Alternatively, the at least one light may comprise a rope light formed as a cable with lights spaced intermittently along it, similar to other rope lights known in the art.

DETAILED DESCRIPTION

Embodiments of the invention will now be described by way of non-limiting example only and with reference to the accompanying drawings, in which.

The figures are not to scale, and same or similar reference signs denote same or similar features.

Figure 1:
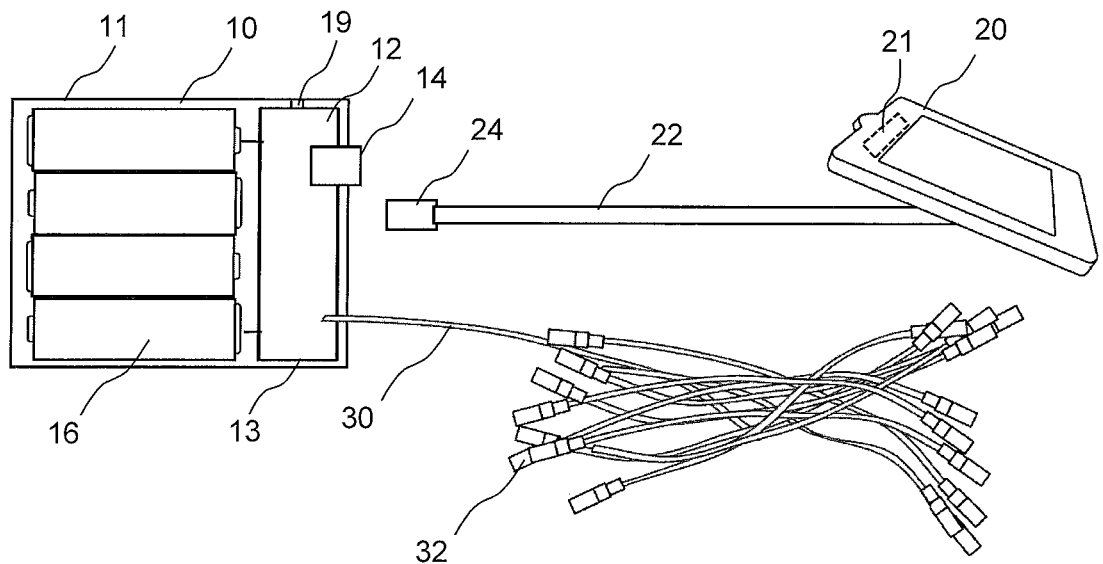
FIG. 1 shows a schematic diagram of a lighting system according to an embodiment of the invention.

An embodiment of the invention will now be described with reference to FIGS. 1 to 3. FIG. 1 shows a lighting system comprising a control unit 10. The control unit 10 has a rectangular waterproof housing 11 which provides a battery holder (bay) for holding batteries 16 within the housing. The housing 11 holds a control circuit 12 on a Printed Circuit Board (PCB) 13. The control circuit 12 is electrically connected to the battery holder and therefore to the batteries 16. The PCB has a socket 14 which is connected to the control circuit 12, and which is accessible through a side of the housing 11. The control unit 10 also has a light sensor 19 which is mounted to the PCB 13 and exposed to light levels in the ambient environment via a window in the side of the housing 11.

The lighting system also comprises a solar panel 20, for converting solar energy into electricity. The solar panel comprises an internal rechargeable battery 21 which is charged when the solar panel 20 is exposed to daylight. The solar panel 20 also comprises a cable 22 which terminates in a plug 24. The cable 22 is electrically connected to the rechargeable battery 21 so the cable 22 delivers electrical power to its plug 24 from the rechargeable battery 21. The plug 24 is suitable for plugging into the socket 14 of the control unit 10, for delivering solar power to the control unit 10.

The lighting system also comprises a rope light having a cable 30 with a plurality of LED lights 32 spaced at regular intervals along the length of the cable. The cable 30 passes into the housing 11 and is connected to the control circuit 12 on the PCB 13. In this embodiment, the cable 30 is permanently connected to the control unit 10, however a plug-socket connection between the cable 30 and the control unit 10 could easily be implemented in alternate embodiments to allow alternative lights to be connected to the control unit.

The control circuit 12 controls the output of electrical power to the rope light cable 30, and outputs the electrical power when the light sensor 19 indicates the ambient light levels have fallen below a threshold level. The control circuit 12 will continue to output the electrical power for a predetermined length of time after the ambient light level has dropped below the threshold level, for example 4 hours. In an alternative embodiment, the control circuit 12 may comprise a daily (24 hr) timer instead of a light sensor, the timer setting the times of day when the control circuit 12 outputs the electrical power. The timer may for example activate the control circuit to output the electrical power and so turn on the LED lights 32 at 6 pm, and deactivate the control circuit to stop outputting the electrical power and so turn off the LED lights 32 at 2 am.

The control circuit 12 operates in three different modes, a mains power mode, a battery power mode, and a solar power mode. In the mains power mode, the control circuit 12 outputs sufficient electrical power to light LEDs 32 at their maximum rated intensity. In the battery power mode, the control circuit 12 outputs sufficient electrical power to light LEDs 32 at 75% of their maximum rated intensity. In the solar power mode, the control circuit 12 outputs sufficient electrical power to light LEDs 32 at 50% of their maximum rated intensity. Clearly, the light intensities for the different modes could vary from those mentioned above in alternate embodiments.

Optionally, the time that the LEDs are lit for may also be dependent on the mode. For example, in the illustrated embodiment in the mains power mode and in the battery power mode, the control circuit 12 lights the LEDs for 8 hours whenever the ambient light level is below the threshold level or when a daily timer activates. But, in the solar power mode, the control circuit 12 lights the LEDs for 4 hours after the ambient light level has fallen below the threshold level or the daily timer circuit activates.

The control circuit 12 automatically switches between the three different modes based on detecting the power sources that are available to it, specifically whether any power is being input into the socket 14, and if so the voltage level of the power. In the configuration shown in FIG. 1, the solar panel 20 is not connected to the control unit 10, and so the control circuit does not detect any power input into the socket 14, and remains in its default mode which is the battery power mode.

Figure 2:
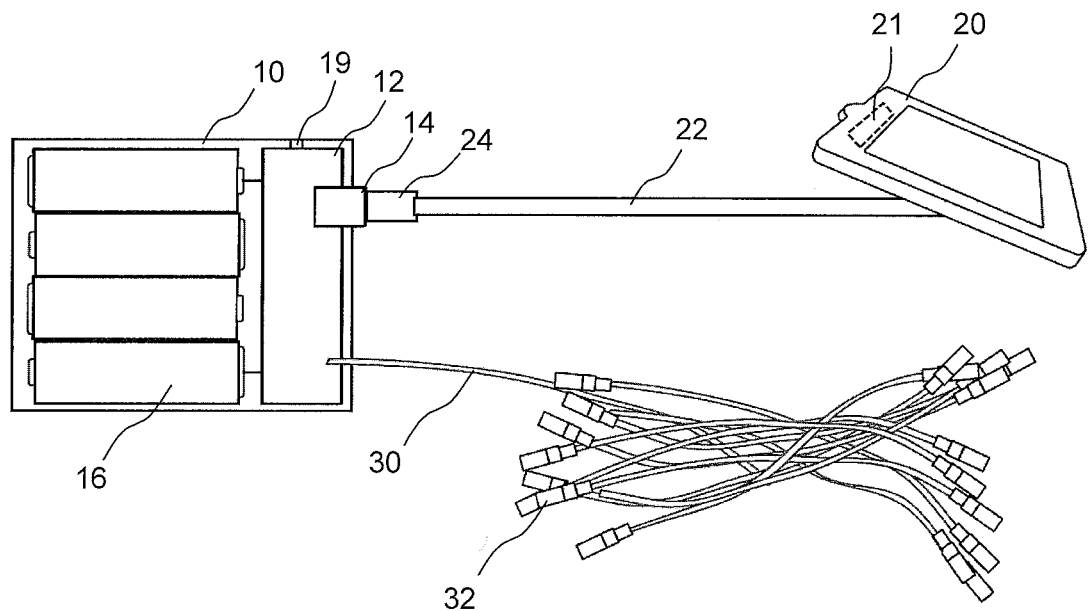
FIG. 2 shows a schematic diagram of the lighting system of FIG. 1 in a solar power mode.

In the configuration shown in FIG. 2, the plug 24 of the solar panel 20 has been plugged into the socket 14 of the control unit 10, supplying power from the rechargeable battery 21 to the control circuit 12. The control circuit 12 detects the voltage from the solar panel, and in response switches into the solar power mode.

Figure 3:
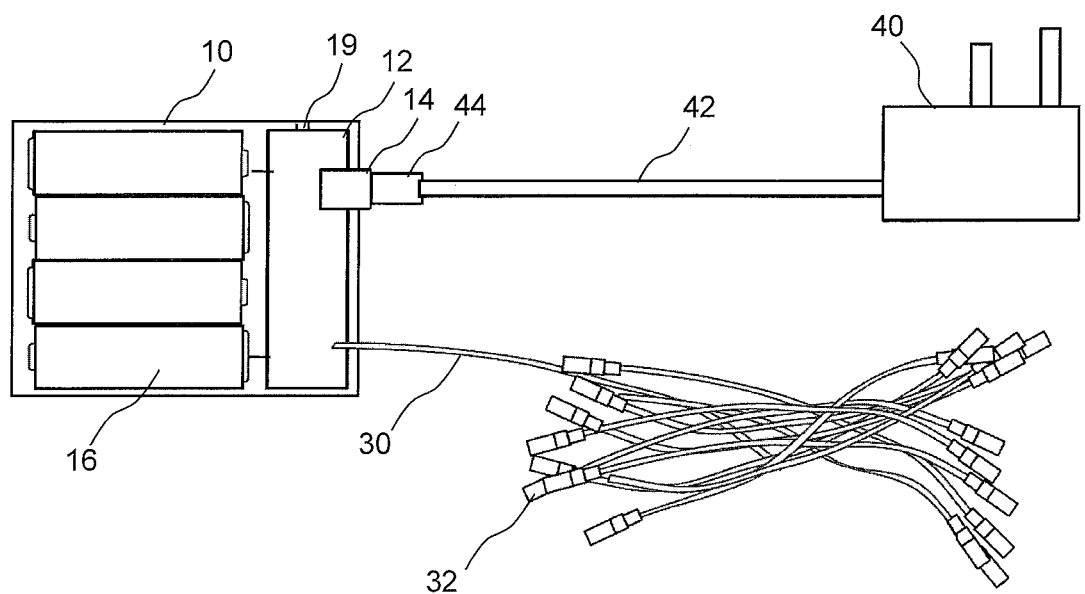
FIG. 3 shows a schematic diagram of the lighting system of FIG. 1 in a mains power mode.

The schematic diagram of FIG. 3 shows a mains power adaptor 40 forming part of the lighting system. The mains power adaptor is for plugging into a mains electricity grid supply, and comprises a cable 42 which terminates in a plug 44. The plug 44 is plugged into the socket 14 of the control unit 10, instead of the solar panel plug 24. The control circuit 12 detects the voltage from the mains power adaptor, and in response switches into the mains power mode.

In an alternate embodiment, the rechargeable battery 21 may be implemented in the control unit 10 rather than the solar panel 20. In that case, the control circuit switches into the solar power mode during daylight when solar power is received at the control circuit via the socket 14, and remains in the solar power mode until the connection at socket 14 is removed or changed.

Figure 4:
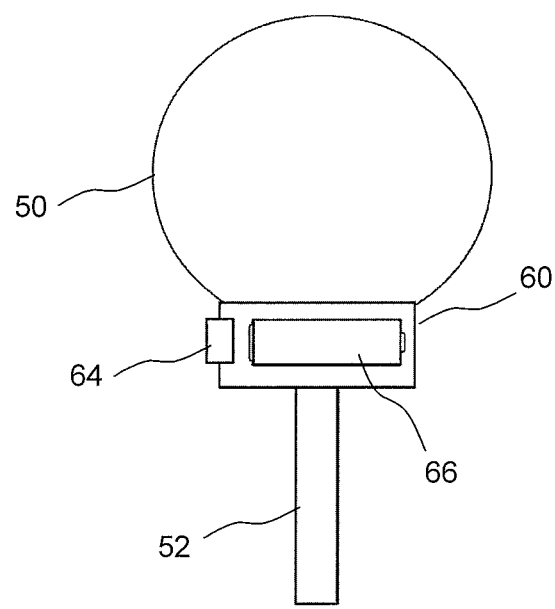
FIG. 4 shows a schematic diagram of a lighting system according to another embodiment of the invention.
Figure 5:
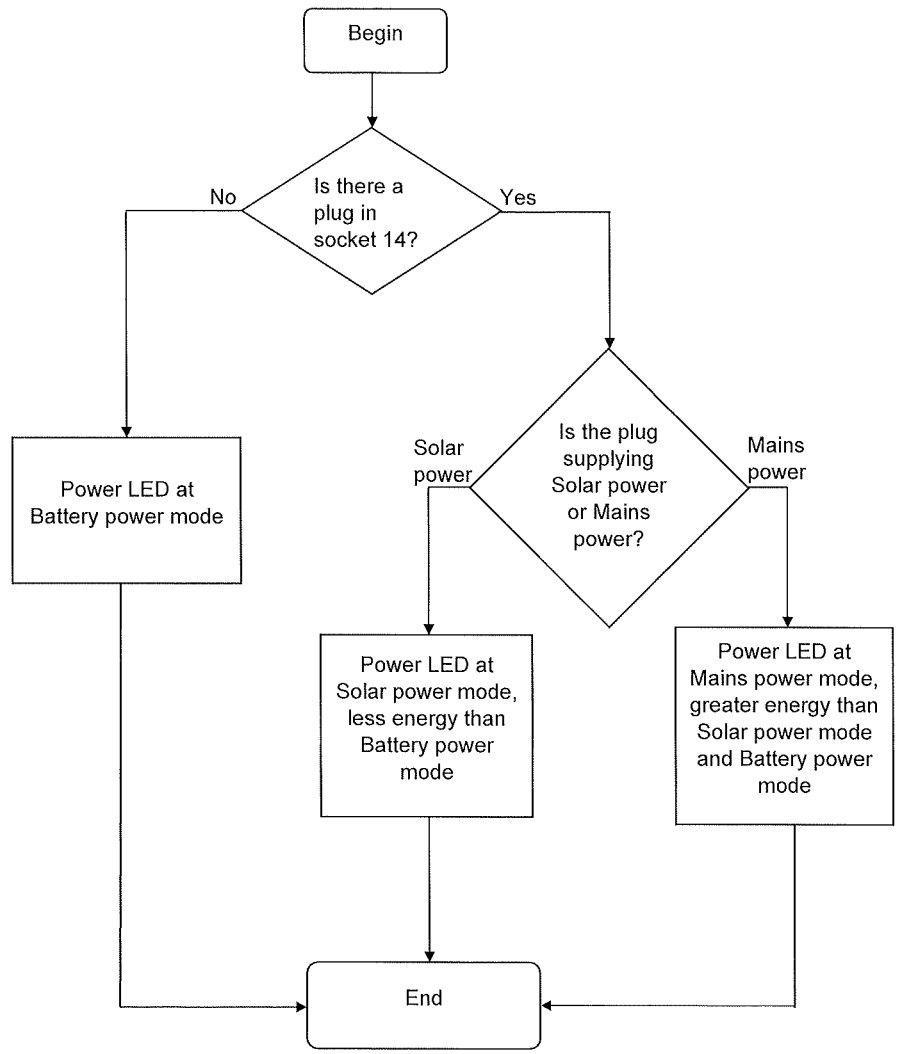
FIG. 5 is a flow chart of one way that power switching decisions may be made in the control unit.

Another embodiment of the invention will now be described with reference to FIG. 4, which shows a globe light housing 50 on a pedestal 52. The globe light housing houses LED light(s), and a control unit 60 is mounted beneath the globe light housing and supplies electrical power to light the LED light(s). The control unit 60 is the same as the control unit 10, except for it is connected to the LED light(s) in the globe light housing instead of to the rope light cable 30. The control unit 60 is running in the battery power mode in FIG. 4, drawing power from a battery 66. However, a socket 64 the same as the socket 14 allows the solar panel 20 or the mains power adaptor 40 to be plugged into the control unit 60 to power the LED light(s). Optionally, the solar panel 20 may be mounted to the pedestal 52.

Many other variations of the described embodiments falling within the scope of the invention will be also apparent to those skilled in the art.

The invention claimed is:

1. A lighting system, comprising a control unit, a solar panel for plugging into the control unit, and at least one light connected to the control unit, wherein the control unit comprises a control circuit, a battery bay for receiving at least one battery that supplies energy in the form of battery power to the control circuit, and a socket for receiving a plug of the solar panel for supplying energy in the form of solar power to the control circuit, wherein the control unit or the solar panel comprises a rechargeable battery for storing the solar power, the rechargeable battery being in addition to the at least one battery receivable in the battery bay, wherein the control circuit detects whether the solar panel is plugged into the control unit, and in response switches from a battery power mode in which the control circuit powers the at least one light from the battery power of the batteries in the battery bay, to a solar power mode in which the control circuit powers the at least one light from the solar power stored in the rechargeable battery, wherein the solar power mode is a mode which uses less energy to light the at least one light in comparison to the energy being used in the battery power mode prior to the switching of the control circuit, wherein the control circuit is configured to power the at least one light at a lower intensity in the solar power mode than in the battery power mode.

2. The lighting system of claim 1, wherein the solar panel comprises the rechargeable battery so the solar panel can supply solar power to the control unit at night time.

3. The lighting system of claim 1, wherein the control unit comprises the rechargeable battery for storing solar power received from the solar panel.

4. The lighting system of claim 1, wherein the control circuit detects whether the solar panel is plugged into the control unit by sensing a voltage or current received from the solar panel.

5. The lighting system of claim 1, further comprising a power adaptor having a plug for supplying mains power to the socket of the control unit, wherein the control circuit detects whether the power adaptor is plugged into the control unit, and in response switches to a mains power mode in which the control circuit powers the at least one light from the mains power, wherein the mains power mode uses more energy in comparison to the energy saving mode.

6. The lighting system of claim 5, wherein the mains power mode uses more energy in comparison to the battery power mode.

7. The lighting system of claim 1, wherein one or more of the at least one lights are housed in a light housing, and wherein the control unit is mounted to the light housing.

8. The lighting system of claim 1, wherein the at least one light comprises a plurality of lights connected at intervals along a cable, and wherein the cable is electrically connected to a power output of the control circuit.

9. The lighting system of claim 1, wherein each of the at least one lights is a light emitting diode.

10. The lighting system of claim 1, wherein the control unit comprises a waterproof housing for outdoor use.

11. The lighting system of claim 1, wherein the control circuit is configured to power the at least one light for less time overnight in the solar power mode than in the battery power mode.

12. The lighting system of claim 1, wherein the control circuit is configured to power the at least one light at a lower light intensity in the solar power mode than in the battery power mode.

13. The lighting system of claim 1, wherein the control unit comprises a light sensor connected to the control circuit.

14. The lighting system of claim 13, wherein the control circuit performs the detection only whilst the light sensor of the control unit indicates that it is daytime.

15. The lighting system of claim 1, wherein the control circuit comprises a timer to control the time of day at which the control circuit powers the at least one light.

* * * * *

UNITED STATES PATENT AND TRADEMARK OFFICE
CERTIFICATE OF CORRECTION

PATENT NO.      : 10,816,151 B2  
APPLICATION NO. : 15/789672  
DATED           : October 27, 2020  
INVENTOR(S)     : Stuart Glennerster Page 1 of 1

It is certified that error appears in the above-identified patent and that said Letters Patent is hereby corrected as shown below:

On the Title Page

Item (30) Foreign Application Priority Data should read --August 4, 2017 (GB) ................1712537.8--

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*